United States Patent

[11] 3,565,167

| [72] | Inventor | Hans Eder<br>Zurich, Switzerland |
| --- | --- | --- |
| [21] | Appl. No. | 793,064 |
| [22] | Filed | Jan. 22, 1969 |
| [45] | Patented | Feb. 23, 1971 |
| [73] | Assignee | Contraves AG<br>Zurich, Switzerland |
| [32] | Priority | Feb. 2, 1968 |
| [33] | | Switzerland |
| [31] | | 1626/68 |

[54] ELECTRICAL MACHINE PROVIDED WITH A COOLING DEVICE
7 Claims, 1 Drawing Fig.

[52] U.S. Cl. .................................................. 165/47;
165/104
[51] Int. Cl. ...................................................... F24h 3/00
[50] Field of Search .......................................... 165/47, 86,
104, 134, 186

[56] References Cited
UNITED STATES PATENTS

| 3,215,194 | 11/1965 | Sununu et al. ................ | 165/104 |
| --- | --- | --- | --- |
| 3,481,439 | 12/1969 | Finkin .......................... | 165/86 |

FOREIGN PATENTS

| 370,786 | 4/1932 | Great Britain................ | 165/104 |

*Primary Examiner*—Charles Sukalo
*Attorney*—Jacobi and Davidson

ABSTRACT: There is disclosed a cooling device for electrical equipment, especially an electrical machine, wherein the cooling action is derived due to the effect of the heat required for changing the phase of a cooling agent. The cooling device incorporates means defining at least one hollow compartment provided at least at one machine portion which tends to rise in temperature or heat up. A solid fusible or meltable cooling agent is provided for this hollow compartment, this solid meltable cooling agent possessing a melting point which is above a predetermined operating temperature and beneath a permissible maximum temperature of the electrical machine.

PATENTED FEB 23 1971
3,565,167
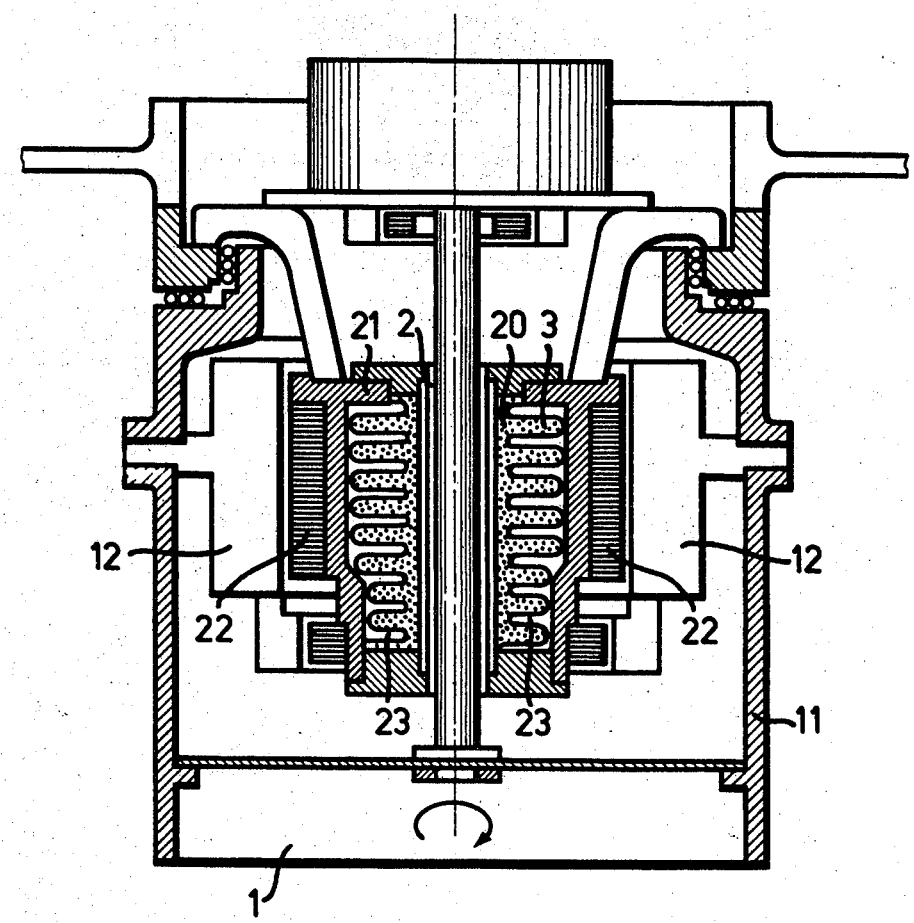
INVENTOR,
HANS EDER
BY Jacobi & Davidson
ATTORNEYS

ELECTRICAL MACHINE PROVIDED WITH A COOLING DEVICE

BACKGROUND OF THE INVENTION

The present invention broadly relates to electrical equipment, and in particular, to an electrical machine provided with a cooling device in which there is effective the heat required for changing the phase of the cooling agent.

It is well known that all materials, even with continuous delivery of heat, do not increase their temperature during a change of state of the aggregate as long as two phases are present, for instance, solid and liquid or liquid and gaseous. The heat is consumed in the form of heat of fusion or heat of vaporization.

Cooling devices of this type are known wherein a cooling liquid is vaporized at the machine portions or components which are to be cooled. However, this type of cooling requires discharge paths for the resulting vapor and, in most instances, also inlets for the liquid cooling agent, as well as a condenser or cooler for the condensation of the cooling agent. Further, pumps are required for transporting the cooling liquid through the cooling system. Special problems are encountered in attempting to provide for a leakproof delivery and discharge of cooling agent to the movable parts, such as, for instance, the rotors of electrical machines. In certain types of servo-or torque motors, it is impossible to dispense with the cooling of the rotor, notwithstanding the fact that only high loads appear for short time intervals. These motors operate with very high power losses of 50 to 60 percent during maximum load. On the other hand, the power loss for these motors with smaller load is percentually much lower.

SUMMARY OF THE INVENTION

Accordingly, it is a primary object of the present invention to provide an improved cooling device for electrical equipment which effectively overcomes the aforementioned drawbacks of the prior art.

Another, more specific object of the present invention relates to a new and improved cooling device for electrical machines which is very simple in construction, relatively inexpensive to manufacture, requires relatively little or no maintenance and minimum expenditure for realizing an effective solution of the cooling problem associated with such electrical machine.

Yet a further significant object of the present invention relates to an improved cooling device for electrical equipment which provides for an effective cooling action without requiring the relatively complicated and expensive cooling system found in the prior art constructions.

Now, in order to implement these and still further objects of the invention, which will become more readily apparent as the description proceeds, the invention contemplates the provision of a cooling device for an electrical machine which incorporates at least one hollow compartment provided for at least a portion of the machine which tends to rise in temperature or heat up. A solid meltable or fusable cooling agent is provided in this hollow compartment. This cooling agent possesses a melting point which is above a predetermined operating temperature and beneath a permissible maximum temperature of the electrical machine.

By virtue of the aforementioned measures, there is obtained a cooling device which provides a very simple, maintenance free solution of the cooling problem which can be realized with a minimum of expenditure. Above all, in the case of movable components there is dispensed with the conventional, structurally expensive and cumbersome leakproof connections with the remainder of the cooling system. If there is used as the cooling agent for the cooling device of the invention, for instance, a paraffin or eiconsane, that is to say, low or high molecular hydrocarbon compounds, then it is readily possible that the cooling action is sufficient for maximum sudden loads of 20 to 100 minutes duration. As a cooling agent there can be used, for instance, a standard industrial paraffin which is available on the market, having the following properties: melting or fusing point $\approx 54°$ C., heat of fusion $\approx 35$ kcal./kg., boiling point $\approx 300°$ C., specific heat $\approx 0.5$ kcal./kg. Grad.

The use of a solid meltable or fusible cooling agent permits the use of closed hollow compartments, since the storage compartment and the cooling compartment are the same. On the other hand, in cooling systems which use the heat of vaporization of the cooling agent, it is practically impossible to employ a single hollow compartment simultaneously as the cooling and storage compartment. The change in volume during the change in phase from liquid to gaseous is too large. On the other hand, the resulting pressures can be very great. Pressure increases result in an increase of the boiling point of liquids, so that the desired cooling action is lost.

With maximum load for only a short period of time, as such for instance occurs with servomotors, the cooling agent will liquify as soon as the melting temperature of the cooling agent has been reached. In the period of time between two load peaks, the cooling agent can again partially or completely solidify by giving up heat. The cooling agent acts as a heat reservoir or heat sink, whereby stored thermal energy or heat is again given up to the surroundings during the time intervals of lower load.

BRIEF DESCRIPTION OF THE DRAWING

The invention will be better understood, and objects other than those set forth above, will become apparent, when consideration is given to the following detailed description thereof. Such description makes reference to the annexed drawing wherein the single FIG. shows in cross-sectional view a preferred embodiment of inventive cooling device associated with an electrical machine, for instance an electrical servomotor.

BRIEF DESCRIPTION OF THE PREFERRED EMBODIMENT

Describing now the drawing, the single FIG. shows in cross-sectional view an exemplary embodiment of electrical machine, in this instance an electrical adjustment or servomotor equipped with the cooling device of the invention. This electrical servomotor will be seen to embody a stator 1 provided with the stator housing 11 and the permanent magnets 12, as well as the rotor 2 equipped with the rotor winding 22. The rotor housing 21 is provided with the closed hollow compartment 20 which is filled with a cooling agent 3. The cooling ribs or fins 23 serve to improve the heat exchange effect between the rotor housing 21 and the cooling agent 3.

It is to be understood that the rotor 2 of the servomotor possesses the temperature $T_n$ during normal operation. This temperature $T_n$ is below the temperature $T_s$, which represents the melting point of the cooling agent 3. During a high sudden load for a short period of time with additional generation of heat, the temperature of the rotor 2 climbs, as well as that of the still solid cooling agent 3 until reaching the temperature $T_s$. However, the temperature $T_s$ is beneath the permissible maximum temperature for the rotor 2.

As soon as the temperature $T_s$ has been reached, the temperature will no longer climb. Any additional heat existing at the rotor 2 will be used for changing the phase, that is to say, will serve to liquify the cooling agent 3. Only after all of the cooling agent 3 has been liquified, will the temperature of the rotor 2 together with the cooling agent increase further. However, the cooling device should be constructed and designed in such a way that during operation the condition that all of the cooling agent 3 will have liquified will never be reached, otherwise the danger exists of overheating the machine.

It should be apparent from the foregoing detailed description, that the objects set forth at the outset to the specification has been successfully achieved.

I claim:

1. In combination with an electrical machine, a cooling device for such electrical machine wherein there is effective the heat required for changing the phase of the cooling agent, comprising means defining at least one hollow compartment provided at least at one machine portion which tends to heat up, a solid meltable cooling agent provided in said hollow compartment, said solid meltable cooling agent possessing a melting point which is above a predetermined normal operating temperature of the electrical machine and beneath a permissible maximum temperature of the electrical machine, so that only upon encountering sudden high loads for a short period of time which might cause said one machine portion to heat up to a temperature exceeding the melting point of the solid meltable cooling agent is there a change of phase from solid to liquid of a sufficient quantity of the solid meltable cooling agent to prevent said machine portion from exceeding said permissible maximum temperature.

2. The combination as defined in claim 1, wherein said electrical machine is constructed as a servomotor having a rotor, said rotor being equipped with said at least one hollow compartment provided with said solid meltable cooling agent.

3. The combination as defined in claim 1, wherein said cooling agent is a hydrocarbon compound.

4. The combination as defined in claim 1, wherein said cooling agent is an eiconsane.

5. The combination as defined in claim 1, wherein said cooling agent is a paraffin.

6. A cooling device for electrical equipment, in particular for a heat-dissipating electrical machine, comprising means defining at least one hermetically sealed hollow compartment directly forming at least a portion of the electrical equipment which tends to rise in temperature, a solid meltable cooling agent provided in said hollow compartment, said solid meltable cooling agent possessing a melting point which is above a predetermined operating temperature of the electrical equipment and beneath a permissible maximum temperature for such electrical equipment, so that upon encountering sudden high loads for a short period of time which might cause said one machine portion to heat up to a temperature exceeding the melting point of the solid meltable cooling agent is there a change of phase from solid to liquid of a sufficient quantity of the solid meltable cooling agent to prevent said machine portion from exceeding said permissible maximum temperature.

7. A cooling device for preventing the rotor of an electrical machine, especially a servomotor, from exceeding a permissible maximum temperature, comprising means constituting part of said rotor and defining at least one hollow compartment directly at the rotor, a solid meltable cooling agent provided for said hollow compartment, said solid meltable cooling agent possessing a melting point which is above a predetermined normal operating temperature for the rotor and beneath a permissible maximum temperature of such rotor, the heat developed at the rotor during short-period peak loads at the electrical machine being utilized to melt said solid cooling agent to thus limit the temperature which said rotor is subjected to prevent such from exceeding the permissible maximum temperature, the latent heat stored by said cooling agent being dissipated during the time interval between peak loads so that the cooling agent again at least partially solidifies.